Figure 1:
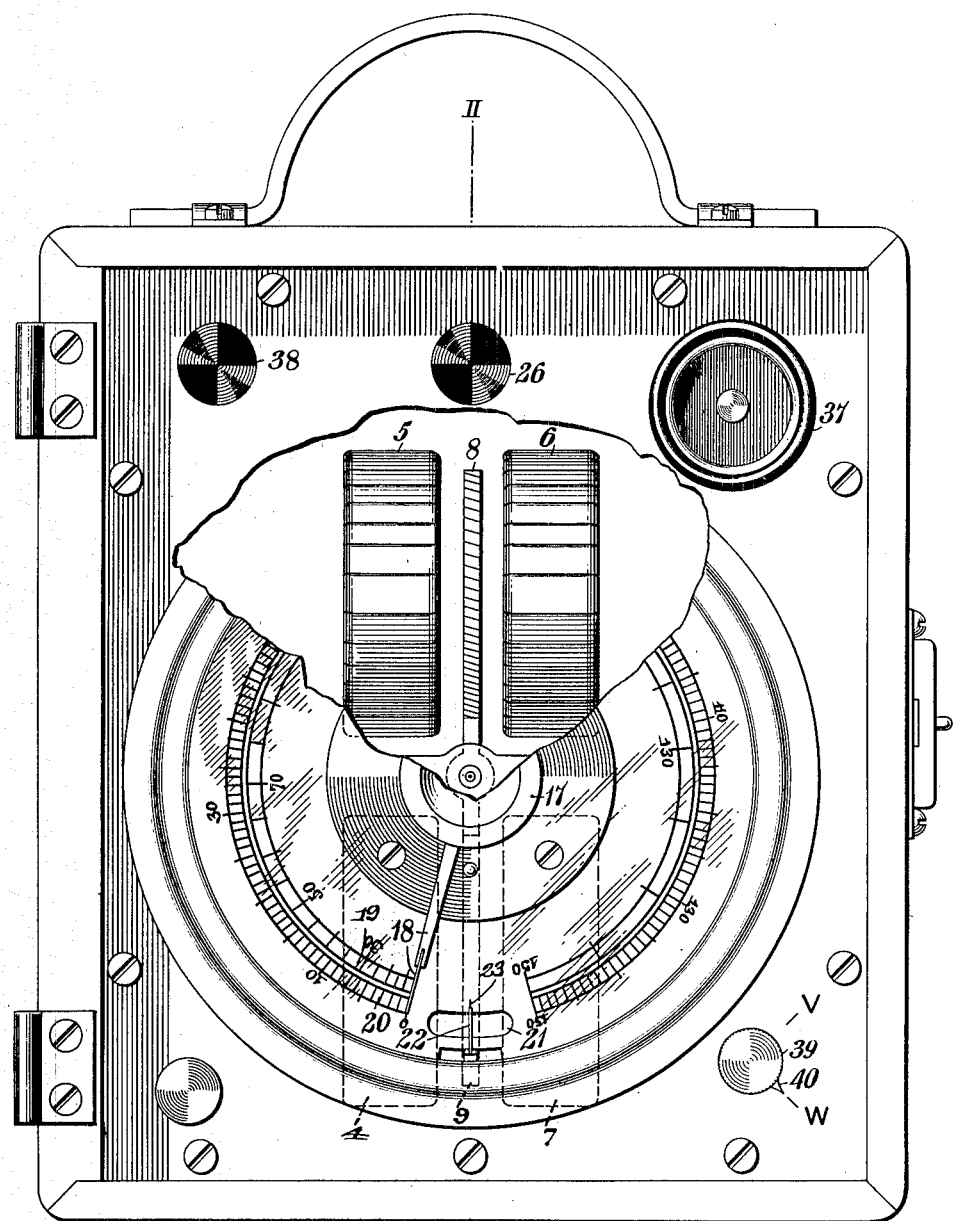

No. 872,300. PATENTED NOV. 26, 1907.
P. MacGAHAN.
ELECTRICAL MEASURING INSTRUMENT.
APPLICATION FILED OCT. 18, 1905.

2 SHEETS—SHEET 1.

WITNESSES:
C. L. Belcher
Otto S. Schairer

INVENTOR
Paul MacGahan
BY
Wesley G. Carr
ATTORNEY

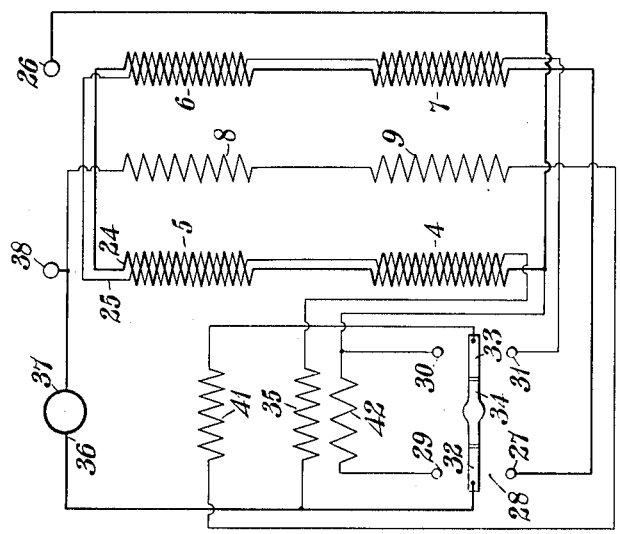

UNITED STATES PATENT OFFICE.

PAUL MacGAHAN, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

No. 872,300.     Specification of Letters Patent.     Patented Nov. 26, 1907.

Application filed October 18, 1905. Serial No. 283,339.

*To all whom it may concern:*

Be it known that I, PAUL MACGAHAN, a citizen of the United States, and a resident of Pittsburg, in the county of Allegheny and State of Pennsylvania, have invented a new and useful Improvement in Electrical Measuring Instruments, of which the following is a specification.

My invention relates to electrical measuring instruments and it has for its object to provide an instrument by means of which either the voltage of a circuit or the amount of energy traversing the circuit may be measured.
In the commercial testing of electrical incandescent and arc lamps the quantities most usually measured are the drop in potential in the lamps and the energy consumed by them. In order that the testing apparatus may be as compact as possible, it is desirable that a single instrument be provided that shall be capable of measuring both of these quantities independently, and it is further desirable that the instrument be so constructed as to be portable. The purpose of this invention is to provide such an instrument.

Figure 1 of the accompanying drawings is a view, partially in plan and partially in section, of an instrument embodying my invention. Fig. 2 is a transverse, sectional view on the line II—II of Fig. 1 and Fig. 3 is a diagrammatic view of the circuit relations and connections of the various parts of the instrument.

Rigidly fastened upon the inner or rear face of an insulating plate 1 by means of screws 2, are insulating blocks 3 to which coils 4, 5, 6 and 7 are secured by means of tape or otherwise, the coils being arranged in pairs with the faces of the members of each pair opposing one another. Two other coils 8 and 9 are mounted, by means of suitable brackets 10, upon a shaft 11 that is provided with bearings 12 and 13 at its upper and lower ends respectively, the coils being thus pivotally supported respectively between the members of the pairs of stationary coils. The inner end of a spiral spring 14 is secured to the upper extremity of the shaft 11 and the outer end is connected by means of a bracket 15 with a manually rotatable member 16, that may be operated by means of a knurled head 17. A pointer 18 that is carried by the rotatable member 16 is adapted to be moved over annular scales 19 and 20, the former of which is graduated in volts as units and the latter in watts as units. An opening 21 is provided in the insulating plate 1 through which projects the free end of a pointer 22 that is attached to the movable coil 9, the pointer coöperating with an index 23 on the upper side of the plate 1 to indicate balancing of the torque of the instrument with the torsion of the spiral spring 14.

The coils 4, 5, 6 and 7 comprise two intercoiled windings 24 and 25, which are respectively of low and high resistance, the winding 24 being connected between a binding post 26 and a contact terminal 27 of a switch 28 that further comprises contact terminals 29, 30 and 31 and conducting segments 32 and 33 that are mounted upon a switch lever 34 and that are adapted to engage contact terminals 27 and 30 or 29 and 31 respectively.

The winding 25 is connected in series circuit with a resistance 35 between contact terminal 31 and one terminal 36 of a socket or receptacle 37 for an incandescent lamp or other suitable translating device, the terminal 36 being also connected to conducting strip 32, and the other terminal of the socket 37 being connected to a binding post 38.

The switch lever 34 is adapted to be operated by means of a knurled head 39 that is located upon the upper side of the insulating plate 1 and that is provided with a pointer 40 which coöperates with indices V and W upon the plate to indicate whether the instrument is adjusted to measure volts or watts.

The movable coils 8 and 9 which are composed of a comparatively high resistance conductor are connected in series relation with a high resistance 41 between the binding post 38 and the conducting piece 33 on the switch lever 34. A resistance 42 that is approximately equal to the resistance of the winding 24 is connected between the contact terminals 29 and 30 and one terminal of the resistance is connected to the binding post 26.

In the operation of the instrument a lamp or other suitable translating device is placed in the socket 37 and the instrument is connected to an external circuit (not shown) by means of the binding posts 26 and 38. If it is desired to measure the drop of potential in the lamp, the knurled head 39 should be rotated until the pointer 40 registers with the index V, the conducting strips 32 and 33 being thereby caused to engage contact terminals 29 and 31 respectively. The translating device is then connected in series with the resistance 42 between the binding posts, and a circuit is also established in shunt to the translating device through the movable coils 8 and 9, the resistance 41, conducting piece 33, contact terminal 31, the stationary winding 25 and resistance 35. The pointer 22 will then be deflected to the left, and in order to return it to a position opposite the index 23 it becomes necessary to turn the knurled head 17 and the attached pointer 18 in a clockwise direction, the deflection from the zero position of the pointer 18 necessary to effect this adjustment being indicated upon the scale 19 in volts.

If it is desired to measure the energy absorbed in the translating device, the knurled head 39 should be caused to occupy the position shown in Fig. 1, when conducting pieces 32 and 33 will engage contact terminals 27 and 30, respectively, and the translating device will be connected in series circuit with the stationary winding 24 between the binding posts by the engagement of the conducting strip 32 with contact terminal 27, a circuit being established also through the movable coils 8 and 9, resistance 41, conducting segment 33 and contact terminal 30 to the binding post 26.

It will be observed that the stationary winding is connected in series with the translating device while the movable coils are connected in shunt thereto, so that the quantities measured by the instrument will be the watts of energy expended in the translating device, which will be indicated upon the scale 20.

It should be noted that the resistance of the circuit that includes the translating device is approximately the same whether the instrument is operated as a wattmeter or as a voltmeter because, in the one case, the winding 24 is in the circuit and in the other case, the equivalent resistance 25 is introduced. The amount of resistance in the circuit in shunt to the translating device is less when the instrument operates as a wattmeter than when it operates as a voltmeter because in the former instance only the resistance 41 is induced in the circuit and in the latter instance both resistances 35 and 41 are included, these differences being for the purpose of providing scales of convenient proportions.

The details of construction and arrangement of the parts of the instrument may be considerably varied from what have here been shown and described specifically without affecting the mode of operation or departing from the scope of my invention.

I claim as my invention:

1. In an electrical measuring instrument, the combination with a receptacle for a translating device, stationary windings respectively of high and low resistance, and a movable winding, of a resistance, and means whereby the said receptacle may be connected between the circuit terminals in series circuit with the low resistance stationary winding and the movable winding may be connected in shunt thereto, or whereby the said receptacle may be connected between the circuit terminals in series with the resistance, and the high resistance stationary winding and the movable winding may be connected in series with each other and in shunt to the receptacle.

2. In an electrical measuring instrument, the combination with a receptacle for a translating device, stationary windings respectively of high and low resistance, and a movable winding, of a resistance approximately equal to that of the low resistance stationary winding, and means whereby the said receptacle may be connected between the circuit terminals in series circuit with the low resistance stationary winding and the movable winding may be connected in shunt thereto, or whereby the said receptacle may be connected between the circuit terminals in series with the resistance, and the high resistance stationary winding and the movable winding may be connected in series with each other and in shunt to the receptacle.

3. In an electrical measuring instrument, the combination with a receptacle for a translating device, stationary windings respectively of high and low resistance, and a movable winding, of a resistance, and means whereby the circuit relations of the parts may be so adjusted as to cause the instrument to operate either as a voltmeter or as a wattmeter and whereby the said receptacle may be connected in series circuit with the resistance in the former instance and in series circuit with the low resistance stationary winding in the second instance.

4. In an electrical measuring instrument, the combination with a receptacle for a translating device, stationary windings respectively of high and low resistance, and a movable winding, of a resistance approximately equal to that of the low resistance stationary winding, and means whereby the circuit relations of the parts may be so adjusted as to cause the instrument to operate either as a voltmeter or as a wattmeter and whereby the said receptacle may be connected in series circuit with the resistance in the former instance and in series circuit with the low resistance stationary winding in the second instance.

5. In an electrical measuring instrument, the combination with a receptacle for a translating device, stationary windings respectively of high and low resistance, and a movable winding, of a resistance approximately equal to that of the low resistance stationary winding, and means whereby the circuit relations of the parts may be so adjusted as to cause the instrument to operate either as a voltmeter or as a wattmeter and the resistance in series circuit with the said receptacle to be maintained approximately the same under either condition.

In testimony whereof, I have hereunto subscribed my name this 13th day of October, 1905.

PAUL MacGAHAN.

Witnesses:
S. M. TRUXAL,
BIRNEY HINES.